(No Model.)
F. J. PFENIGAR.
HAND WHEEL FOR CAR BRAKES.
No. 509,448. Patented Nov. 28, 1893.
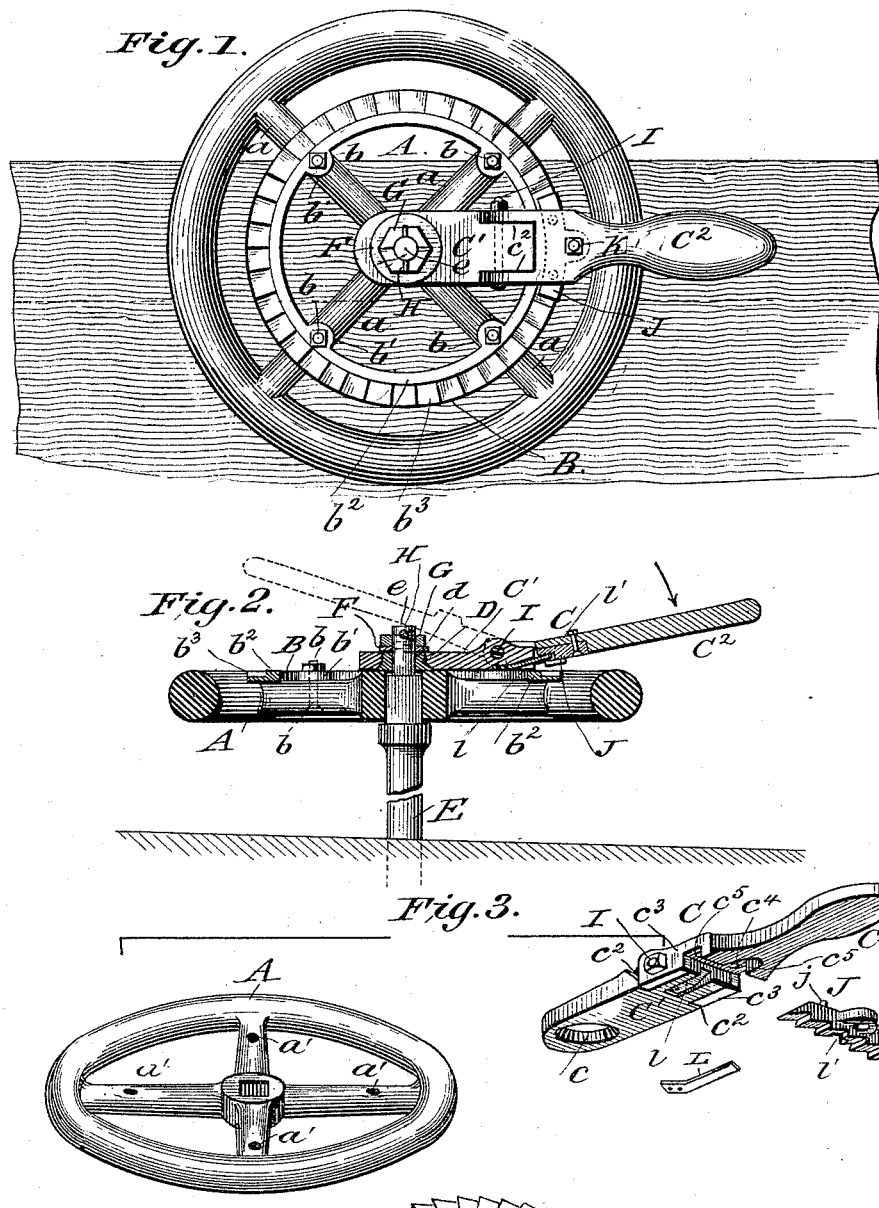
WITNESSES:
Fred G. Dieterich
M. D. Blondel
INVENTOR:
Frank J. Pfenigar
BY Munn & Co
ATTORNEYS

UNITED STATES PATENT OFFICE.

FRANK. J. PFENIGAR, OF BAY CITY, MICHIGAN.

HAND-WHEEL FOR CAR-BRAKES.

SPECIFICATION forming part of Letters Patent No. 509,448, dated November 28, 1893.

Application filed March 23, 1893. Serial No. 467,291. (No model.)

*To all whom it may concern:*

Be it known that I, FRANK. J. PFENIGAR, residing at Bay City, in Bay county and the State of Michigan, have invented a new and Improved Car-Brake Hand-Wheel, of which the following is a specification.

In the use of car brake hand wheels, it is very inconvenient and sometimes difficult to manipulate them during cold weather, owing to the numbness of the brakeman's hands, and his consequent inability to firmly grasp the rim of the wheel. Lever attachments for such wheels have been provided whereby the wheel may be operated to the more effectively apply the brakes, but in such attachments, so far as I know the lever devices are connected with the wheel in such a manner as to make it either impossible or inconvenient to turn the brake wheel in the ordinary manner when so desired.

To provide a brake wheel having lever devices attached in such a way as to permit at all times the use of the wheel in the ordinary manner, and also to allow it to be turned by such lever devices when desired is the main object of my invention.

With other minor objects in view which will hereinafter appear, my invention consists in the peculiar and novel arrangement of parts, such as will be first described and then specifically pointed out in the claims, reference being had to the accompanying drawings, in which—

Figure 1 is a top plan view of a brake wheel with my improvements applied. Fig. 2 is a transverse section of the same taken on the line 2—2 Fig. 1, and Fig. 3 is a perspective view of several of the parts detached.

In the accompanying drawings A indicates the hand wheel which is of the ordinary construction, except that its spokes $a$ have apertures $a'$ to receive the securing bolts $b$, which secure an annular ratchet ring B, detachably to the arms, it being manifest however that in practice, sockets may be formed in such arms in which to seat the ring B, and which may be held therein by clips or other means.

It will be noticed by referring to the drawings that the ring B is secured on the arms $a$ in such a manner as to provide ample finger space between it and the rim $a^2$, whereby such rim can be conveniently grasped and manipulated by hand when desired.

The ratchet ring B, which is preferably formed of steel, has ears $b'$ through which the bolts $b$ pass, which secure same to the arms $a$, and an inner or guide flange $b^2$ which projects up flush with the top of the teeth $b^3$, to form a guide for the operating lever. The lever C comprises an inner section C′ and an outer hinged member C² and such inner section C′ has a beveled aperture $c$ which fits on a beveled washer D, apertured as at $d$ to slip over the end $e$ of the shaft E.

F indicates a washer which fits over the shaft and bears on the washer D, and G denotes the securing nut which is held from becoming loose by the pin H which passes transversely through the upper end of the shaft E, and seats in grooves $g$ in the nut G as clearly shown in Fig. 2.

The described construction provides for a secure pivotal bearing for the lever C, without causing such lever to bind on the wheel A. The outer end of the section C has side recesses $c^2$, in which fit the bifurcated arms $c^3$ of the section C², which arms are pivoted on the transverse bolt I.

It will be noticed by reference to Fig. 3 the section C² has a socket $c^4$ to receive a detachable steel dog or claw member J. This member J has studs $j$, which fit sockets $c^5$ in the socket $c^4$, and an apertured ear $j'$ through which passes the securing bolt K.

As shown in Fig. 2, the outer edge of the section C bears and rides upon the flange $b'$, while the dog J is held to engage the toothed portion of the ring. By making the pivotal joint near the inner edge of the ring B the leverage power of the lever C is thereby increased. Furthermore by joining the sections C′ and C² at the point shown, the outer sections C² when swung back to the position shown in dotted lines in Fig. 2 will be out of the way, and thereby leave the wheel A free to be operated by grasping the rim in the ordinary manner.

It is obvious that by forming the ring B and claw member J of steel and detachably securing them in place more effective gripping contact faces are provided, which, when worn out, can be readily replaced without disconnecting or otherwise interfering with the use of the wheel A.

To normally hold the lever section $C^2$ from engagement with the ratchet wheel B, a spring L is provided which is secured in a seat $l$ in the lower face of the section C', with its free end projected into a recess $l'$ in the claw member J as most clearly shown in Fig. 2.

The object in holding the arm C' out of engagement with the wheel B is to allow for a free movement of the wheel when releasing the brake, without rotating the lever C with it.

Having thus described my invention, what I claim, and desire to secure by Letters Patent, is—

1. A car brake wheel having an annular toothed ring on its upper face disposed at a point inside its rim, whereby a finger space is provided between such ring and rim, a lever journaled on the wheel shaft and formed with a hinged member having a dog or claw adapted to engage the toothed ring,—said hinged member constructed to swing back from engagement with the rim of the said wheel, substantially as and for the purpose described.

2. In a car brake wheel, in combination, the wheel A, the shaft E, the toothed ring B, detachably secured on the wheel at a point inside its rim, the lever C, comprising a section C' journaled on the shaft, and a section $C^2$ pivoted to the section C' at a point adjacent the inner edge of the said ring B, said section $C^2$ having a detachable claw or dog J, arranged to engage the toothed ring B, all substantially as and for the purposes described.

3. The combination with the shaft E, the wheel A, and the toothed ring B, said ring having a flange or guide rim $b^2$ of the lever C formed of an inner member C' journaled on the shaft F, its outer end held to travel on the flange $b^2$ and the outer or handle member $C^2$ pivoted to the inner member C' said member $C^2$ having a socket on its under face and the claw or dog J detachably fitted in such socket, all arranged substantially as in the manner shown and for the purposes described.

FRANK. J. PFENIGAR.

Witnesses:
FRED G. DIETERICH,
SOLON C. KEMON.